United States Patent [19]

Clegg

[11] 4,325,612

[45] Apr. 20, 1982

[54] REFLECTIVE BEAM CONCENTRATOR

[76] Inventor: John E. Clegg, 2320 Keystone Dr., Orlando, Fla. 32806

[21] Appl. No.: 260,582

[22] Filed: May 6, 1981

[51] Int. Cl.³ .................. G02B 13/18; G02B 17/08
[52] U.S. Cl. .................................. 350/432; 126/438; 350/443
[58] Field of Search ............... 350/432, 443; 126/438, 126/439, 440

[56] References Cited

U.S. PATENT DOCUMENTS 2,882,784  10/1978  Toffolo ........................... 350/432

Primary Examiner—John K. Corbin
Assistant Examiner—Rebecca D. Gass

[57] ABSTRACT

The disclosure is an optical instrument which produces a concentrated beam of light by reducing the size of an incipient beam. An annular incipient solar beam is reflected inward to a concave conical lens which refracts the beam out of the lens in a direction parallel to the incipient beam. The concentrated beam is composed of parallel rays of coherent light similar to the laser beam.

1 Claim, 2 Drawing Figures

REFLECTIVE BEAM CONCENTRATOR

BACKGROUND OF THE INVENTION

The invention relates to optical instruments, specifically to beam concentrators which reduce the size of beams of light by reflection and refraction.

Prior art includes the spherical magnifying lens which produces convergent beams by focusing rays to a point and four beam concentrators invented by the applicant: Conical Split-Image Microscopic Lens, Patent Application Ser. No. 06/209,865, dated Nov. 24, 1980 now U.S. Pat. No. 4,277,148; Prismatic Beam Concentrator, application Ser. No. 254,953, filed Apr. 4, 1981 now abandoned; and Conical Beam Concentrator, application Ser. No. 260,593, filed May 6, 1981.

SUMMARY OF THE INVENTION

The reflective beam concentrator is unique and superior to the concentrators listed above in that it uses a relatively wide concave conical mirror which reflects an annular solar beam inward to a conical lens to produce beams of high intensity. (Intensity is the quotient of the area of the incipient beam divided by the area of the concentrated beam.) The intensities of a single stage of the conical split-image concentrator is 4.3, of the conical beam concentrator, 18.8, as compared to intensities of 14.7, 25.8 and 56.3 of the reflective concentrators, with the differences in intensities being determined by the conical angles of the lenses.

A disadvantage of the reflective beam concentrator is that it cannot be used in stages like the other concentrators, because its incipient beam is annular and its concentrated beam is circular. It cannot produce intensities in the hundreds and thousands which are possible with the multiple-stage concentrators.

The intensities of the reflective beam concentrators fall in the range which will be used to cook food and to heat water for domestic use and interior heating.

DESCRIPTION OF THE PREFERRED EMBODIMENT

Figure 1:
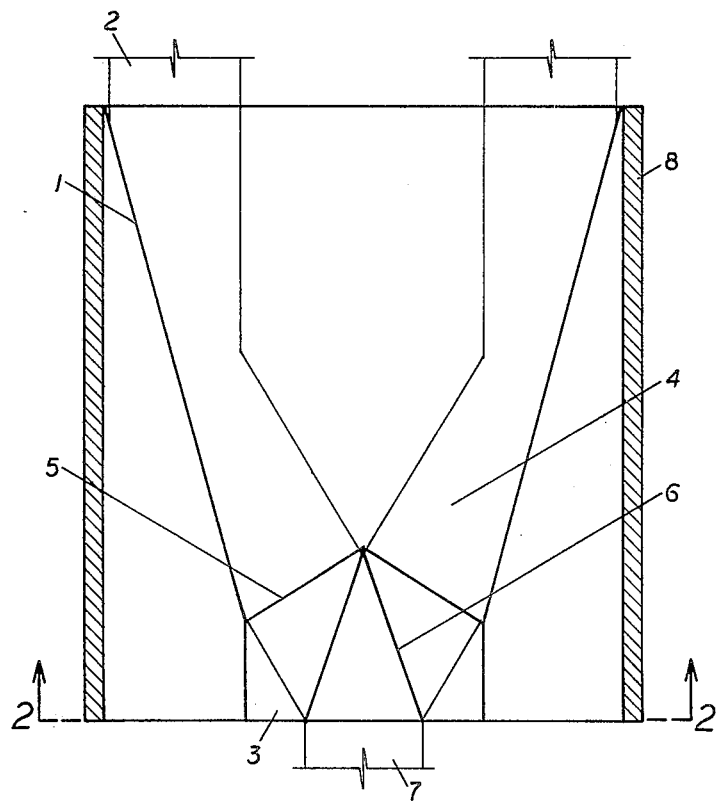
FIG. 1 is a longitudinal section of a reflective beam concentrator.

The reflective beam concentrator shown in FIG. 1 has an annular concave conical mirror 1 which reflects an incipient solar beam 2 inward to conical lens 3. Reflected beam 4 is transmitted through convex conical section 5 of conical lens 3 to concave conical section 6, which refracts the beam out of the lens as concentrated beam 7. Mirror 1 and conical lens 3 are enclosed in casing 8.

The angle of incidence of incipient beam 2 and the angle of reflection of reflected beam 4 is 70°. Convex conical section 5 is perpendicular to the line of propagation of reflected beam 4. The angle of incidence of reflected beam 4 with concave conical section 6 is 40° and the angle of refraction is 75°.

Figure 2:
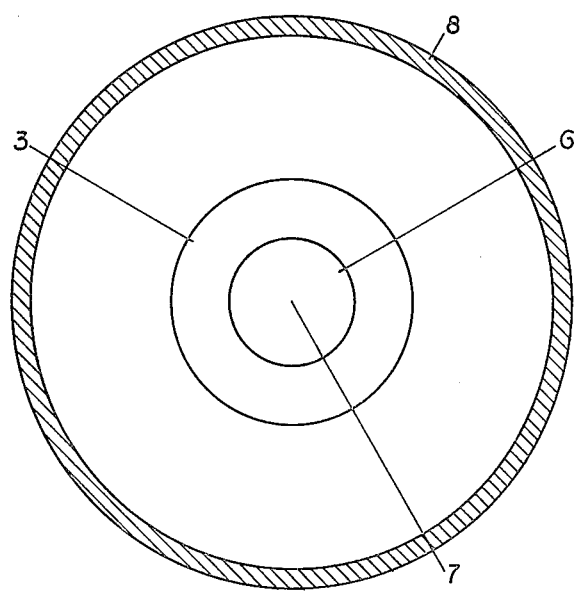
FIG. 2 is a cross section taken on line 2—2 of FIG. 1.

FIG. 2 shows the cross sectional dimensions of the reflective beam concentrator, with concentrated beam 7 emanating from concave conical section 6 of conical lens 3.

All non-reflecting, non-transmitting and non-refracting surfaces of mirror 1 and conical lens 3 are opaque.

I claim:

1. A reflective beam concentrator consisting of an annular concave mirror and a conical lens mounted inside a casing and aligned on a common axis which is parallel to light rays entering and exiting the concentrator, with all surfaces of the mirror and lens not used for the reflection, transmission and refraction of light rays being opaque;
   (a) with the annular concave conical mirror having a concave reflective surface which receives parallel solar rays and reflects these rays inward to the conical lens,
   (b) with the conical lens having a convex conical section which receives parallel rays reflected from the concave reflective surface of the annular concave conical mirror and transmits these rays in a straight line through the conical lens,
   (c) with the conical lens having a concave conical section which receives parallel rays transmitted from the convex conical section of the conical lens and refracts these rays out of the conical lens in a direction parallel to the common axis of the annular concave conical mirror and conical lens.

* * * * *